Patented Aug. 15, 1933

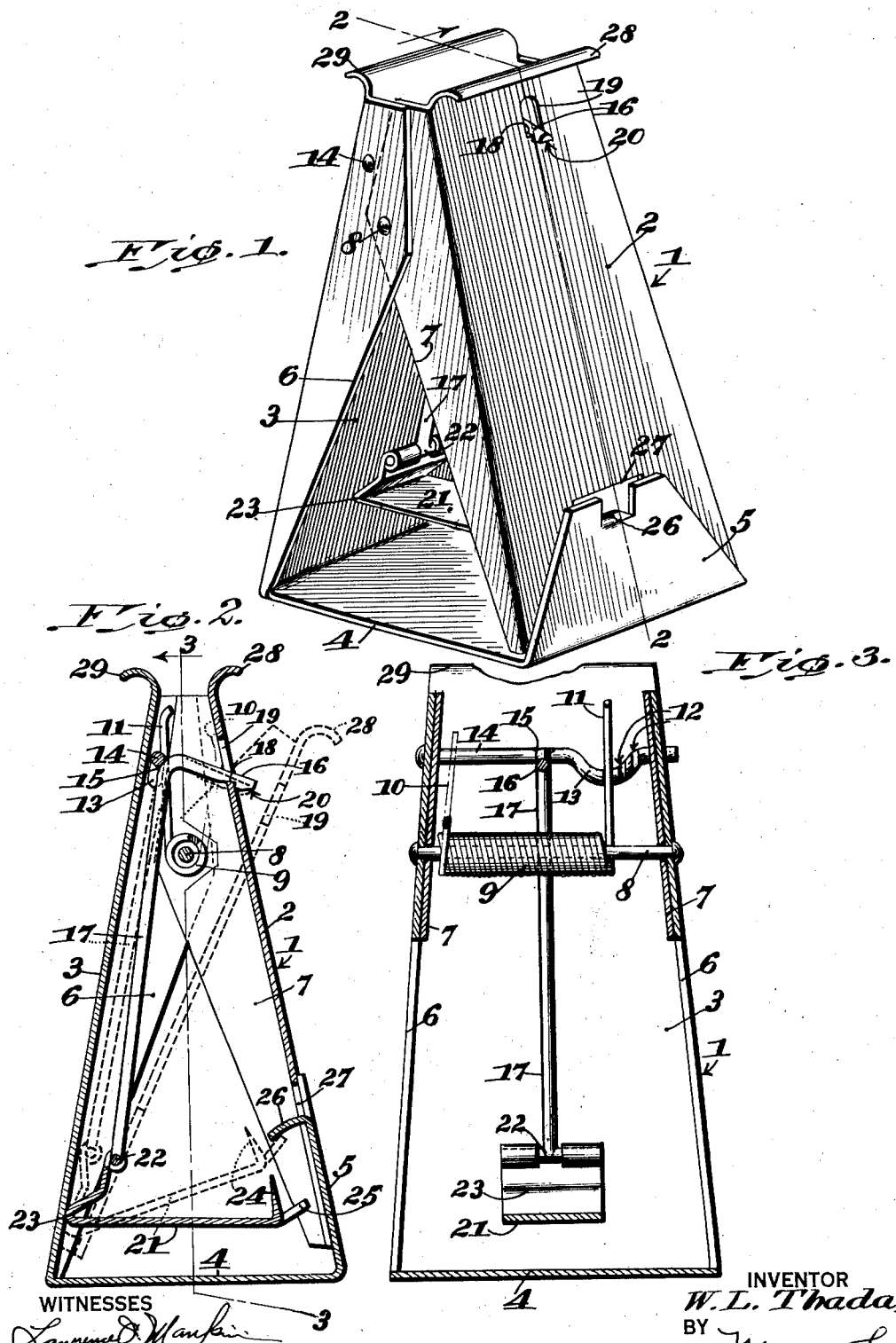

1,922,265

UNITED STATES PATENT OFFICE 1,922,265

ANIMAL TRAP

Walter L. Thada, Klemme, Iowa

Application May 20, 1932. Serial No. 612,576

5 Claims. (Cl. 43—97)

This invention relates to improvements in animal traps, and its objects are as follows:—

First, to provide an animal trap in which the stationary and movable walls combine to form a closed runway when the trap is set.

Second, to hinge one of the side walls to the companion side wall at a point near the top of the trap and above the detent, this arrangement enabling a mere pressing together of the upper extremity of the trap to accomplish its setting, which act is accomplished simultaneously with the placing of the trap in the selected position.

Third, to provide a trap in which the trigger mechanism is set automatically by the act of emplacing the trap.

Fourth, to provide an adjustable trigger mechanism in which the tension of the trap may be varied so that the trap may be sprung according to any one of a limited range of pressures.

Other objects and advantages will appear in the following specification, reference being had to the accompanying drawing in which Figure 1 is a perspective view of the animal trap in its set position.

Figure 2 is a vertical section taken on the line 2—2 of Figure 1.

Figure 3 is a vertical section taken substantially on the line 3—3 of Figure 2.

In carrying out the invention provision is made of a body, generally denoted 1, which comprises a movable side wall 2, a companion stationary side wall 3, a base 4 and a guard wall 5. The walls 2 and 3 comprise the jaws of the trap, the wall 2 being the movable jaw and the wall 3 the stationary jaw. The foregoing parts of the body are usually constructed of sheet metal of a suitable gauge, bent into such forms that when they are assembled the trap assumes roughly a pyramidal shape.

Figures 1 and 2 plainly show how the foregoing walls combine to form what has been called a closed runway. The runway is closed in the sense that its sides are closed, forming a central tunnel through which the animal is induced to run. Rodents, especially, have a tendency to seek narrow runways, and inasmuch as the trap provides such a runway the rodents will be induced to run through it when crowded into a corner or other tight place, and it will not always be necessary to bait the trap because the trip (later described) is placed in such an obstructing position in the runway that it is bound to be stepped upon.

The various walls 2, 3 and 5 taper upwardly and inwardly from the base 4. The base is thus the largest part of the trap insofar as its plan aspect is concerned, and if the base will fit in a selected location it becomes self-evident that the rest of the trap will fit assuming, of course, that there is enough vertical space to accommodate the height of the trap.

Flanges 6 bent inwardly at right angles from the stationary side wall 3 provide places on which similar flanges 7 on the movable side wall 2 are pivoted by means of a cross pin 8. This cross pin provides a convenient mount for the coils of a spring 9 which is for the purpose of closing the trap when sprung. The free ends 10, 11 branch off from the spring 9 at opposite sides of the cross pin 8, the end 10 which comes nearest to the observer in Figure 3 being partially denoted by broken lines because it extends into a zone in front of the general plane on which the section is taken. The end 10 presses outwardly against the jaw 2 at a place above the pivot 8 (Fig. 2) and thus tends to close the jaw 2.

A trigger mechanism comprises parts now to be described, these consisting of a number of depressions 12 (Fig. 3) any one of which is adapted to receive the free end 11. These depressions are formed in a crank or offset 13 in the pivot rod 14 of the trigger mechanism. The purpose of the plurality of depressions 12 is to vary the spring tension so that the trap may be sprung according to any one of a range of pressures which is limited by the number of depressions. Inasmuch as the depressions are distributed over the side of the offset 13 it will presently appear that the spring tension is lessened as the end 11 is set in depressions nearer to the rod 14.

A wire bent into the general shape of a hook (Fig. 2) is soldered or otherwise permanently secured to the rod 14 as at 15, the bent components of this wire constituting a detent 16 and a trip support 17. The detent is notched at 18 for the purpose of catching the bottom edge of a slot 19 near the upper end of the movable jaw 2 when the trap is in the set position. The nether side of the detent 16 is bevelled at its free extremity as at 20 to provide a cam against which the bottom edge of the slot 19 moves in the act of setting the trap for the purpose of putting the spring 9 under a superficial tension and lowering the trip 21 from its unset position (dotted lines, Fig. 2) to its set position (full lines, Fig. 2).

This trip has a forked part bent over the T-end 22 of the support 17 to provide a pivotal suspension for the trip. A shoulder 23, formed in the various bends of the trip, acts as a fulcrum for the trip. The adjacent wall 3 serves as the abutment against which the fulcrum is pressed by the end 11 of the spring 9 and on which the trip turns when the support 17 is urged to the full line position (Fig. 2) in the foregoing act of setting.

A tine 24 struck up from the trip 21 provides a convenient bait holder. It is not always necessary to bait the trap because the trip 21 extends crosswise of the runway in such a position that an animal moving through is bound to contact it and spring the trap. An adjacent part 25 of the trip which completes the trigger mechanism is engageable with a stop 26, bent inwardly from the guard wall 5, for the purpose of limiting the upward swing of the trip to the unset position. The main purpose of the stop 26 is to provide something to press the trip 21 up against by finger pressure beneath the trip when forcing the bait onto the tine 24 preparatory to setting the trap. The engagement of the pivotal suspension 22 with the wall 3 limits the upward swing of the trip, but if this engagement were relied upon when forcing the bait on it is likely that the trip would be bent out of shape at the fulcrum 23.

There is an opening 27 in the bottom of the jaw 2 large enough to clear the free end of the trip 21 and its carried bait. It is through this opening that the stop 26 projects when the trap is set. Outwardly bent curvatures 28, 29 or otherwise described formations, at the upper extremities of the respective jaws 2, 3, provide convenient fingerholds which enable the setting of the trap by a mere pressing together. These curvatures are taken hold of in emplacing the trap in the selected location, and as the trap is emplaced the curvatures are pressed inwardly so as to simultaneously set the trap.

The operation is readily understood. When the trap is in its unset position the movable side wall or jaw 2 assumes the dotted line position in Figure 2. The part 25 of the trip 21 is up against the stop 26, and if it is intended to bait the trap the user will insert a finger under the trip and press it against the stop 26 while forcing the bait onto the tine 24.

Having baited the trap the user takes hold of the curvatures 28, 29 preparatory to emplacing the trap in the selected location. The trap is set by a mere pressing together of the upper extremities, and the act of setting is accomplished simultaneously with the act of emplacing the trap. In pressing the extremities 28, 29, together the lower edge of the slot 19 will approach the bevel 20 of the detent 16. The resulting cam action raises the detent a little, gives the pivot rod 14 a fractional turn and swings the trip support 17 inwardly from the dotted line position to the full line position in Figure 2. At the same time the trip 21 is lowered by virtue of its rocking on its fulcrum 23, and the spring 9 is put under a slight superficial tension which is maintained as long as the notch 18 retains the lower edge of the slot 19.

The greatest superficial tension is made to manifest itself when the spring end 11 is set in the depression 12 in the deep part of the offset 13. This is so because there is a greater amount of inward movement of the deep part of the offset on the foregoing fractional turn of the pivot rod 14 than there is of other parts of the offset nearer to the rod. Therefore, if the spring end 11 is set in the depression nearest to the rod, the superficial tension of the spring will be least of all.

When the spring end 11 is set as last stated, only a very light pressure on the trip 21 will spring the trap. When the spring end 11 is set in the deep end of the offset 12 a slightly greater pressure on the trip 21 will be required.

There is no danger of inadvertently springing the trap during the act of emplacing it, because the same finger grip which is necessary to hold the trap serves to do the setting and to keep the trap set. From this it will be understood that it is unnecessary for the user to insert his fingers in the trap when setting it. Should it be desired to release the trigger mechanism, the user has only to press upon the exposed end of the detent 16.

The trapped animal is released by simply taking hold of and pressing in on the fingerholds 28, 29 and turning the trap sidewise. When the jaws are opened the animal will fall out.

I claim:—

1. A trap comprising a base, a guard and a fixed jaw in spaced relationship on the base, a movable jaw and means by which it is pivoted to the fixed jaw, resilient means tending to swing the movable jaw to a closed position against the fixed jaw, and trip mechanism for holding the movable jaw open against the guard, said jaws being in upstanding relationship to the base and combining to form a closed runway, a portion of said trigger mechanism being accessible from said runway.

2. A trap comprising a pair of movably connected jaws, trigger mechanism carried by one of the jaws including a detent to engage the other jaw and hold the jaws separated, resilient means putting both the trigger mechanism and one of the jaws under tension, and means for adjusting the tension of said resilient means as applied to the trigger mechanism.

3. A trap comprising a pair of movably connected jaws, a trigger mechanism including a detent for holding one of the jaws in an open position and including a rod by which said mechanism is mounted on the other jaw, said rod having an offset with depressions between the deep part of the offset and the rod, and resilient means putting both the trigger mechanism and said one jaw under tension, said resilient means including an end which is settable in any one of the depressions to vary the applied tension to the trigger mechanism.

4. In a trap, a base, a wall and a guard each upstanding from opposite sides of the base, a trigger mechanism pivotally suspended from the wall and including a trip crossing the base toward the guard and having a tine for the emplacement of the bait, and a stop on the guard against which the trip is pressible by a finger inserted between the trip and the base preparatory to empaling the bait, thus sustaining the trip and preventing bending of parts of the trigger mechanism.

5. In a trap, a stationary wall, a trigger mechanism including a pivot rod having a trip support disposed beside the wall, a trip pivotally connected with said support and having a shoulder loosely contacting the wall to act as a fulcrum, a movable jaw coacting with the stationary wall and having a slot, resilient means against the tension of which said jaw is movable to a set position, and a detent included in said mechanism to engage an edge of the slot for holding the jaw in the set position, said detent having a bevelled extremity engageable by the slot edge with a cam action for actuating the trigger mechanism to swing the trigger on its fulcrum into a set position.

WALTER L. THADA.